(12) United States Patent
Tsukamoto et al.

(10) Patent No.: US 8,735,020 B2
(45) Date of Patent: May 27, 2014

(54) FUEL CELL

(75) Inventors: Keiji Tsukamoto, Wako (JP); Shigeru Toda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/642,742

(22) PCT Filed: May 2, 2011

(86) PCT No.: PCT/JP2011/060898
§ 371 (c)(1),
(2), (4) Date: Oct. 22, 2012

(87) PCT Pub. No.: WO2011/162035
PCT Pub. Date: Dec. 29, 2011

(65) Prior Publication Data
US 2013/0040223 A1 Feb. 14, 2013

(30) Foreign Application Priority Data

Jun. 23, 2010 (JP) ................................. 2010-142633

(51) Int. Cl.
*H01M 8/10* (2006.01)
(52) U.S. Cl.
USPC ........................................................ 429/490
(58) Field of Classification Search
None
See application file for complete search history.

(56) References Cited

U.S. PATENT DOCUMENTS

| 2003/0134174 | A1 | 7/2003 | Akikusa et al. |
| 2004/0076867 | A1* | 4/2004 | Day et al. ......................... 429/32 |
| 2007/0015015 | A1 | 1/2007 | Hoshino et al. |
| 2007/0072043 | A1* | 3/2007 | Badding et al. ................. 429/35 |
| 2009/0098433 | A1* | 4/2009 | Komada et al. ................. 429/30 |
| 2010/0297521 | A1* | 11/2010 | Ogawa et al. ................. 429/456 |

FOREIGN PATENT DOCUMENTS

| EP | 1 482 585 | 12/2004 |
| JP | 2002-358980 | 12/2002 |
| JP | 2003-331871 | 11/2003 |
| JP | 2008-251238 | 10/2008 |

OTHER PUBLICATIONS

Japanese Office Action, Application No. 2010-142633 dated Dec. 3, 2013, with partial English translation, 3 pages.

* cited by examiner

*Primary Examiner* — Patrick Ryan
*Assistant Examiner* — Jose Colucci Rios
(74) *Attorney, Agent, or Firm* — Rankin, Hill & Clark LLP

(57) ABSTRACT

A fuel cell includes an anode current collector provided between an anode and a separator for collecting electrical energy generated in the electrolyte electrode assembly, and supplying a fuel gas to an electrode surface of the anode. The separator has at least one fuel gas inlet hole for supplying the fuel gas to the anode current collector. The anode current collector has at least one fuel gas inlet channel having an opening that faces an opening of the fuel gas inlet hole at an end of the fuel gas inlet hole, for allowing the fuel gas supplied through the fuel gas inlet hole to flow into the anode current collector.

13 Claims, 18 Drawing Sheets

FUEL CELL

TECHNICAL FIELD

The present invention relates to a fuel cell formed by stacking an electrolyte electrode assembly between separators. The electrolyte electrode assembly includes an anode, a cathode, and an electrolyte interposed between the anode and the cathode.

BACKGROUND ART

Typically, solid oxide fuel cells (SOFC) employ an electrolyte of ion-conductive solid oxide such as stabilized zirconia. The electrolyte is interposed between an anode and a cathode to form an electrolyte electrode assembly. The electrolyte electrode assembly is sandwiched between a pair of separators (bipolar plates). In use, generally, predetermined numbers of the separators and the electrolyte electrode assemblies are stacked together to form a fuel cell stack.

In the fuel cell, for example, a flat plate type solid oxide fuel cell is adopted. In the flat plate type solid oxide fuel cell, for example, a plate-shaped separator is stacked on an anode of a plate-shaped electrolyte electrode assembly with an anode current collector interposed between the separator and the anode, and a plate-shaped separator is stacked on a cathode thereof with a cathode current collector interposed between the separator and the cathode. In the structure, sponge-like porous material of Ni based alloy or the like is used for the anode current collector. Likewise, sponge-like porous material of Ag based alloy or the like is used for the cathode current collector.

In a solid oxide fuel cell disclosed in Japanese Laid-Open Patent Publication No. 2002-358980, as shown in FIG. 17, a fuel electrode layer 2a and an air electrode layer 3a are provided respectively on both surfaces of a solid electrolyte layer 1a. A fuel electrode current collector 4a and an air electrode current collector 5a made of porous cushion material are provided respectively on the outer sides of the fuel electrode layer 2a and the air electrode layer 3a. Separators 6a are provided on the outer sides of the fuel electrode current collector 4a and the air electrode current collector 5a, respectively.

Each of the fuel electrode current collector 4a and the air electrode current collector 5a is made of a porous body having gradient composition. More specifically, the composition thereof changes continuously from dense to coarse in the thickness direction. Further, the fuel electrode current collector 4a and the air electrode current collector 5a are interposed respectively between the fuel electrode layer 2a and the separator 6a and between the air electrode layer 3a and the separator 6a such that dense layers having smaller pores are provided at the contact surface between the fuel electrode current collector 4a and the fuel electrode layer 2a and at the contact surface between the air electrode current collector 5a and the air electrode layer 3a, while coarse layers having larger pores are provided at the contact surface between the fuel electrode current collector 4a and the separator 6a and at the contact surface between the air electrode current collector 5a and the separator 6a.

Further, in a solid oxide fuel cell disclosed in Japanese Laid-Open Patent Publication No. 2008-251238, as shown in FIG. 18, a flat plate type power generation cell 4b having an oxygen-containing gas electrode layer 2b and a fuel electrode layer 3b on both surfaces of a solid electrolyte layer 1b is provided. An oxygen-containing gas electrode current collector 5b and a fuel electrode current collector 6b each made of porous cushion material are provided on the outer sides of the power generation cell 4b.

Separators 7b are provided on the outer sides of the oxygen-containing gas electrode current collector 5b and the fuel electrode current collector 6b. Ejection ports 8b are provided in the separators 7b. The oxygen-containing gas is supplied from one of the ejection ports 8b to the oxygen-containing gas electrode layer 2b through the oxygen-containing gas electrode current collector 5b, while the fuel gas is supplied from the other ejection port 8b to the fuel electrode layer 3b through the fuel electrode current collector 6b. A hole 9b is formed at a position of the oxygen-containing gas electrode layer 2b that faces the oxygen-containing gas ejection port 8b of the separator 7b.

SUMMARY OF INVENTION

In Japanese Laid-Open Patent Publication No. 2002-358980, the fuel electrode current collector 4a has a dense layer having smaller pores at the contact surface with the fuel electrode layer 2a, and has a coarse layer having larger pores at the contact surface with the separator 6a. In the structure, movement of the fuel gas flowing inside the fuel electrode current collector 4a may be obstructed in the vicinity of the fuel electrode layer 2a. Further, the fuel gas may flow through a space between the fuel electrode current collector 4a and the separator 6a. Under the circumstances, the fuel gas is not suitably supplied to the interface between the fuel electrode current collector 4a and the fuel electrode layer 2a, and the power generation efficiency becomes low disadvantageously.

Further, the layer of the fuel electrode current collector 4a at the contact surface with the fuel electrode layer 2a is dense having small pores. Therefore, when a load is applied to the entire solid oxide fuel cell in the stacking direction, the fuel electrode current collector 4a may not tightly contact the fuel electrode layer 2a (and also the air electrode current collector 5a may not tightly contact the air electrode layer 3a). Under the circumstances, the electrical resistance is not reduced, and improvement in the power generation efficiency cannot be achieved.

Further, in Japanese Laid-Open Patent Publication No. 2008-251238, the oxygen-containing gas electrode current collector 5b has the hole 9b facing the oxygen-containing gas ejection port 8b, and the fuel electrode current collector 6b does not have such a hole. In the structure, the flow of the fuel gas is blocked by the fuel electrode current collector 6b, and cannot be suitably supplied to the triple phase boundary. Therefore, power generation efficiency becomes low disadvantageously. In particular, in an anode-supported cell (ASC), the thickness of the fuel electrode layer 3b becomes considerably large, and the power generation efficiency becomes low much more.

The present invention has been made to solve the problems of this type, and an object of the present invention is to provide a fuel cell in which an electrolyte electrode assembly tightly contacts separators, reduction in the electrical resistance is achieved, and a fuel gas is supplied suitably and reliably to the electrolyte electrode assembly.

The present invention relates to a fuel cell formed by stacking an electrolyte electrode assembly between separators. The electrolyte electrode assembly includes an anode, a cathode, and an electrolyte interposed between the anode and the cathode.

The fuel cell includes an anode current collector provided between the anode and the separator, for collecting electrical energy generated in the electrolyte electrode assembly, and supplying a fuel gas to an electrode surface of the anode. The separator has at least one fuel gas inlet hole for supplying the fuel gas to the anode current collector.

The anode current collector has at least one fuel gas inlet channel having an opening that faces an opening of the fuel gas inlet hole at an end of the fuel gas inlet hole, for allowing the fuel gas supplied through the fuel gas inlet hole to flow into the anode current collector.

In the present invention, the anode current collector can have functions of gas permeation, gas diffusion, load absorption, thermal expansion difference absorption or the like in addition to the current collection function. Further, the electrolyte electrode assembly can contact the separator more tightly, and reduction in the electrical resistance is achieved easily.

Further, blocking of the flow of the fuel gas by the anode current collector in the vicinity of the opening at the downstream end of the fuel gas inlet hole is suppressed, and blowing-out of the fuel cell from between the anode current collector and the separator is suppressed. Therefore, the fuel gas can be supplied to the electrolyte electrode assembly suitably and reliably, and improvement in the power generation efficiency is achieved advantageously.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
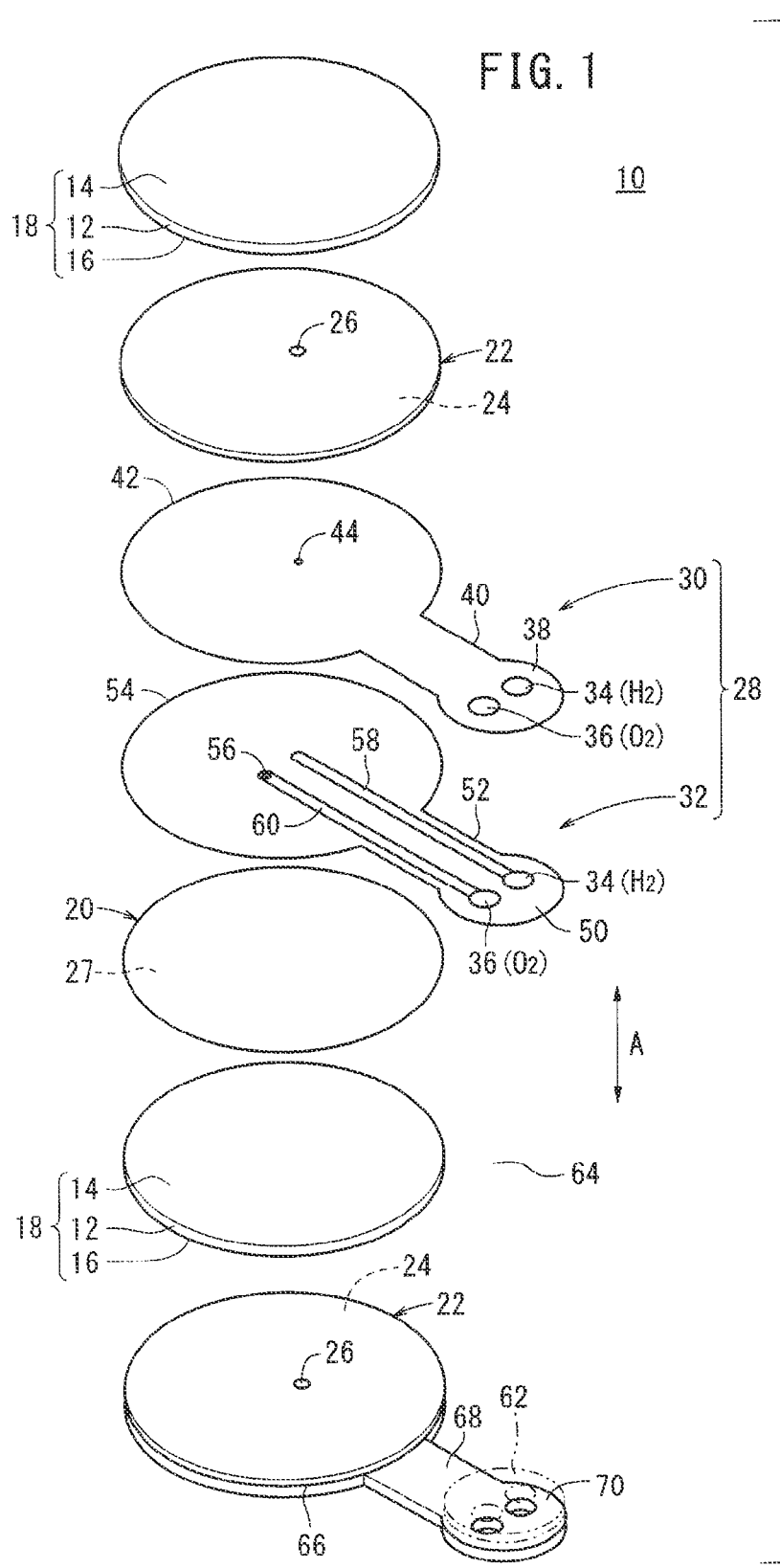
FIG. 1 is an exploded perspective view showing a fuel cell according to a first embodiment of the present invention.

As shown in FIG. 1, a fuel cell 10 according to a first embodiment of the present invention is a flat-plate type solid oxide fuel cell. A plurality of the fuel cells 10 are stacked together. The fuel cell 10 is used in various applications, including stationary and mobile applications. For example, the fuel cell 10 is mounted on a vehicle.

Figure 2:
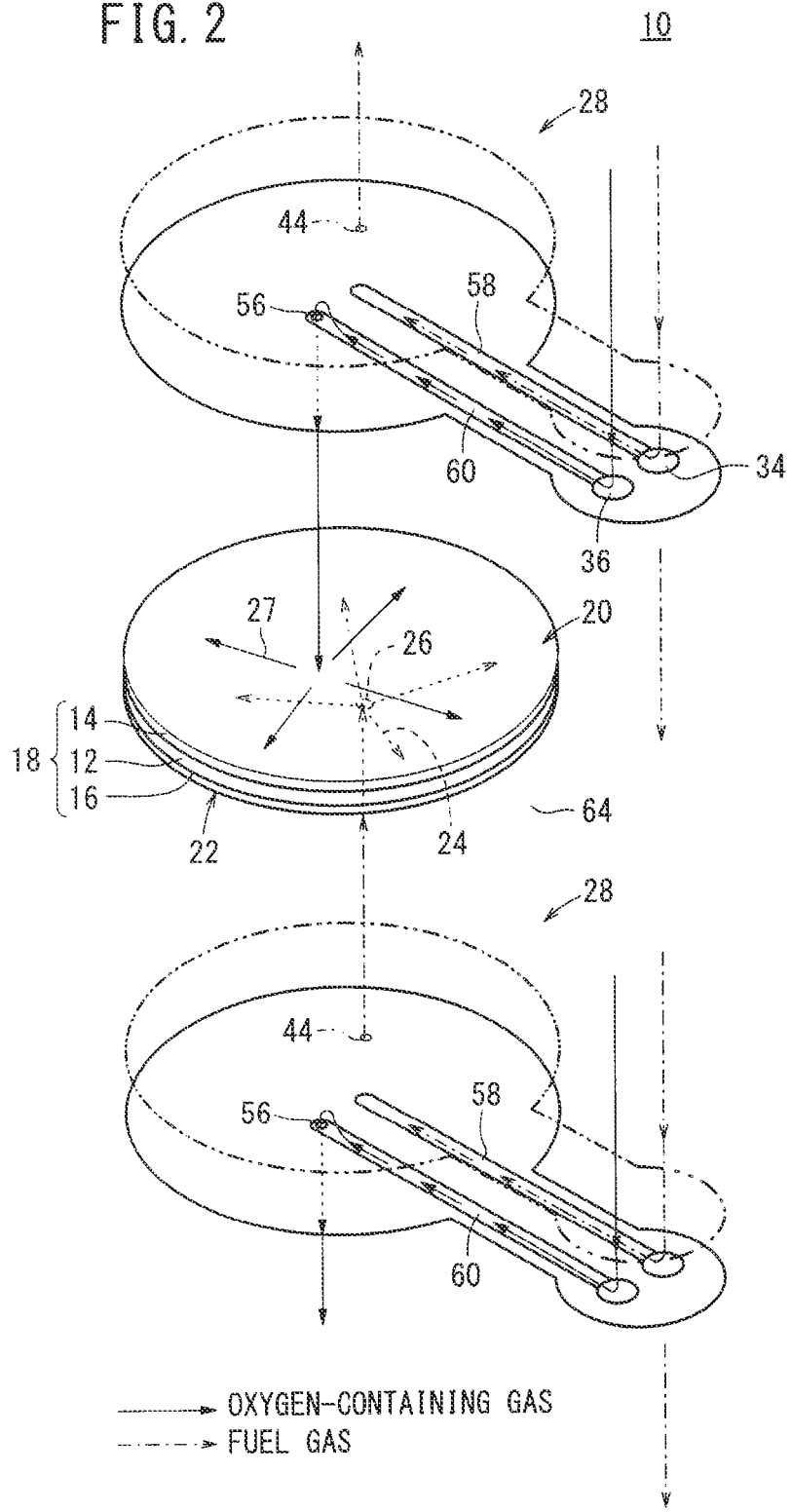
FIG. 2 is a partially exploded perspective view showing gas-flow in the fuel cell.

As shown in FIGS. 1 and 2, the fuel cell 10 includes electrolyte electrode assemblies 18. Each of the electrolyte electrode assemblies 18 includes a cathode 14, an anode 16, and an electrolyte (electrolyte plate) 12 interposed between the cathode 14 and the anode 16. For example, the electrolyte 12 is made of ion-conductive solid oxide such as stabilized zirconia. The electrolyte electrode assembly 18 has a circular disk shape. A barrier layer (not shown) is provided at least on the outer circumferential edge of the electrolyte electrode assembly 18, for preventing entry of the oxygen-containing gas or the fuel gas into the outer circumferential edge of the electrolyte electrode assembly 18 or discharge of the oxygen-containing gas or the fuel gas from the outer circumferential edge of the electrolyte electrode assembly 18.

Figure 3:
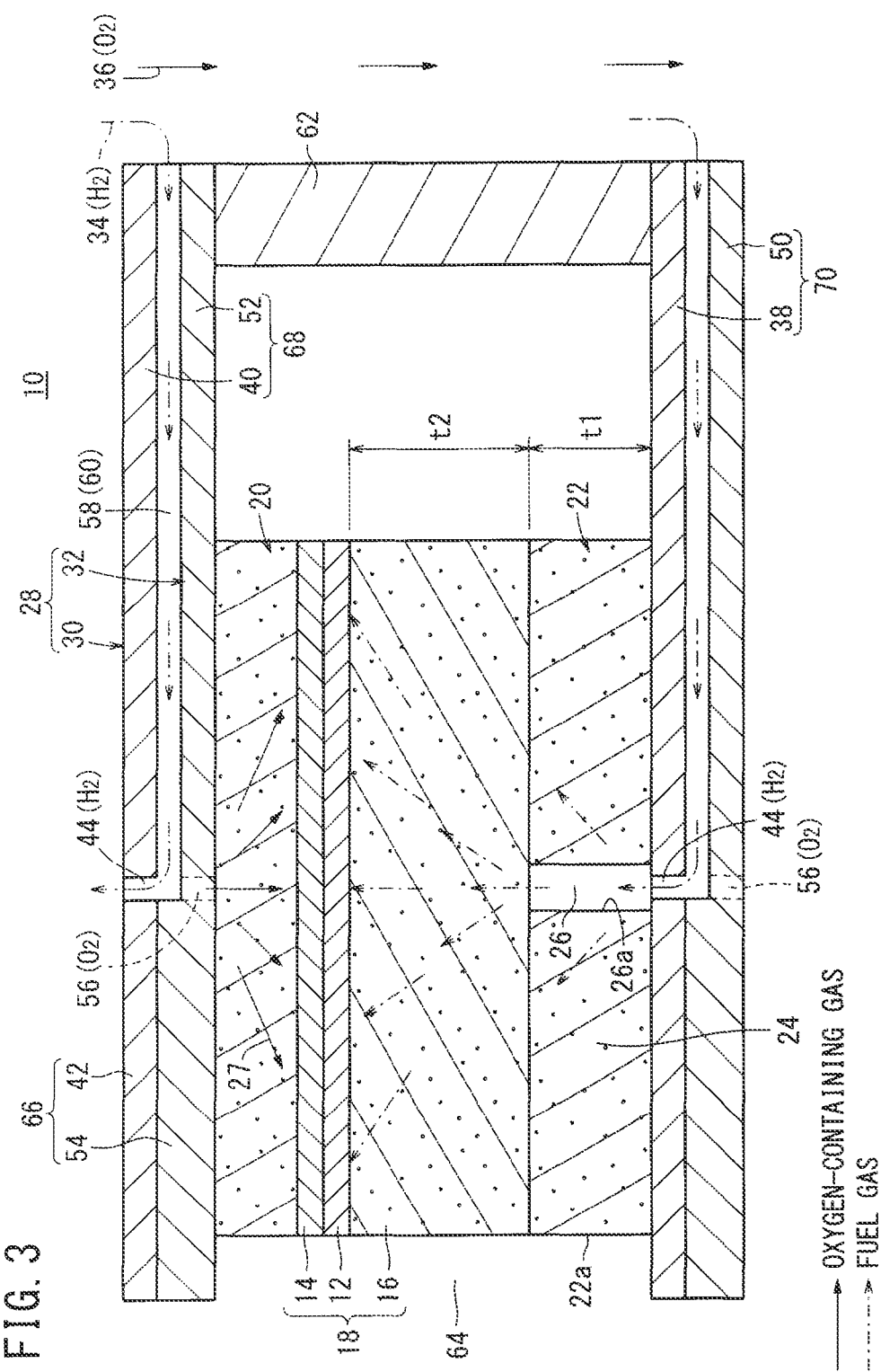
FIG. 3 is a cross sectional view schematically showing operation of the fuel cell.

As shown in FIG. 3, the electrolyte electrode assembly 18 is an anode supported electrolyte electrode assembly, i.e., an anode supported cell (ASC) having the anode 16 as a supporting substrate. The thickness t2 of the anode 16 is considerably larger than the thickness of the cathode 14 and the thickness of the electrolyte 12.

A cathode current collector 20 having a circular disk shape is stacked on the cathode 14 of the electrolyte electrode assembly 18, and an anode current collector 22 having a circular disk shape is stacked on the anode 16 of the electrolyte electrode assembly 18. For example, foamed metal of Ni (nickel), nickel alloy, steel material (SUS material) plated with nickel, silver (Ag), silver alloy, or steel material plated with silver is used as the anode current collector 22.

A fuel gas channel 24 is provided inside the anode current collector 22 for supplying the fuel gas to an electrode surface of the anode 16. Further, a fuel gas inlet channel 26 is provided inside the anode current collector 22 for allowing the fuel gas supplied through a fuel gas inlet hole 44 as described later to flow into the anode current collector 22.

In the anode current collector 22, an inner wall 26a of the fuel gas inlet channel 26 is dense in comparison with portions of the anode current collector 22 other than the inner wall 26a. Specifically, densification of the inner wall 26a is achieved by forming the fuel gas inlet channel 26 by punching or laser-processing. The outer peripheral portion of the anode current collector 22 is subjected to, for example, a densification treatment by laser thereby to have a dense layer 22a. The thickness t1 of the anode current collector 22 is smaller than the thickness t2 of the anode 16.

A structure of the cathode current collector 20 may be identical to that of the anode current collector 22. An oxygen-containing gas channel 27 is formed in the cathode current collector 20 for supplying the oxygen-containing gas to an electrode surface of the cathode 14.

As shown in FIG. 1, the fuel cell 10 is formed by sandwiching a single electrolyte electrode assembly 18 between a pair of separators 28. The cathode current collector 20 and the anode current collector 22 are interposed between the electrolyte electrode assembly 18 and the separators 28. The separator 28 includes a first plate 30 and a second plate 32. For example, the first plate 30 and the second plate 32 are metal plates of, e.g., stainless alloy. The first and second plates 30, 32 are joined to each other, for example, by brazing, diffusion bonding, or laser welding.

The first plate 30 includes a first reactant gas supply section 38, and a fuel gas supply passage 34 and an oxygen-containing gas supply passage 36 extend through the first reactant gas supply section 38 for supplying the fuel gas and supplying the oxygen-containing gas, respectively, in the stacking direction indicated by the arrow A. The first reactant gas supply section 38 is integral with a first sandwiching section 42 having a relatively large diameter through a narrow first bridge section 40.

The first sandwiching section 42 has a circular disk shape which is the same size as the electrolyte electrode assembly 18. A fuel gas inlet hole 44 for supplying the fuel gas is formed, for example, at a position deviated from the center of the first sandwiching section 42.

The fuel gas inlet channel 26 of the anode current collector 22 has an opening facing an opening at an end of the fuel gas inlet hole 44. The cross sectional area of the opening of the fuel gas inlet channel 26 is larger than the cross sectional area of the opening of the fuel gas inlet hole 44 (see FIG. 3).

The second plate 32 has a second reactant gas supply section 50, and the fuel gas supply passage 34 and the oxygen-containing gas supply passage 36 extend through the second reactant gas supply section 50. The second reactant gas supply section 50 is integral with a second sandwiching section 54 having a relatively large diameter through a narrow second bridge section 52. An oxygen-containing gas inlet hole 56 for supplying the oxygen-containing gas is formed at a position deviated from the center of the second sandwiching section 54, oppositely to the fuel gas inlet hole 44.

A fuel gas supply channel 58 for supplying the fuel gas from the fuel gas supply passage 34 to the fuel gas inlet hole 44 and the oxygen-containing gas supply channel 60 for supplying the oxygen-containing gas from the oxygen-containing gas supply passage 36 to the oxygen-containing gas inlet hole 56 are provided in the second bridge section 52. The fuel gas supply channel 58 and the oxygen-containing gas supply channel 60 may be provided in the first bridge section 40 of the first plate 30.

Insulating seals 62 for sealing the fuel gas supply passage 34 and the oxygen-containing gas supply passage 36 are provided between the separators 28. For example, mica material, ceramic material, crustal component material, glass material, and composite material of clay and plastic may be used for the insulating seals 62. In the fuel cell 10, an exhaust gas channel 64 is formed around the first sandwiching section 42 and the second sandwiching section 54 (see FIGS. 1 and 3).

As shown in FIG. 1, in the separator 28, the first sandwiching section 42 of the first plate 30 and the second sandwiching section 54 of the second plate 32 are joined together to form a sandwiching section 66 having a circular disk shape. The sandwiching section 66 is connected to a bridge section 68 formed by joining the first bridge section 40 and the second bridge section 52 together. The bridge section 68 is connected to a reactant gas supply section 70 formed by joining the first reactant gas supply section 38 and the second reactant gas supply section 50 together.

Operation of the fuel cell 10 having the above structure will be described below.

The fuel gas such as a hydrogen-containing gas is supplied to the fuel gas supply passage 34, and the oxygen-containing gas (hereinafter also referred to as the air) is supplied to the oxygen-containing gas supply passage 36.

As shown in FIGS. 2 and 3, the fuel gas flows through the fuel gas supply passage 34 of each fuel cell 10 in the stacking direction indicated by the arrow A, and flows through the fuel gas supply channel 58 along the surfaces of the separators 28.

Then, the fuel gas from the fuel gas supply channel 58 flows through the fuel gas inlet hole 44 formed in the first sandwiching section 42, and flows into the fuel gas inlet channel 26 of the anode current collector 22. The fuel gas inlet channel 26 is formed substantially at the central position of the anode 16 of the electrolyte electrode assembly 18. Therefore, after the fuel gas flows through the fuel gas inlet channel 26, the fuel gas is supplied to a substantially central region of the anode 16. The fuel gas moves toward the outer circumferential region of the anode 16, and part of the fuel gas moves along the fuel gas channel 24 of the anode current collector 22, and moves toward the anode 16.

In the meanwhile, the air flows through the oxygen-containing gas supply passage 36 of the fuel cell 10 in the stacking direction indicated by the arrow A, and the air flows through the oxygen-containing gas supply channel 60 of each fuel cell 10 along the surfaces of the separators 28.

Then, the air from the oxygen-containing gas supply channel 60 flows through the oxygen-containing gas inlet hole 56 formed in the second sandwiching section 54, and flows into the oxygen-containing gas channel 27 of the cathode current collector 20. The oxygen-containing gas inlet hole 56 is formed substantially at the central position of the cathode 14 of the electrolyte electrode assembly 18. Therefore, after the air flows through the oxygen-containing gas inlet hole 56, the air is supplied to a substantially central region of the cathode 14. Then, the air moves along the oxygen-containing gas channel 27 toward the outer circumferential region of the cathode 14.

Thus, in each of the electrolyte electrode assemblies 18, the fuel gas flows from the center to the outer circumferential side on the electrode surface of the anode 16, and the air is supplied from the center to the outer circumferential side on the electrode surface of the cathode 14. At this time, oxygen ions (oxide ions) flow through the electrolyte 12 toward the anode 16 for generating electricity by electrochemical reactions.

The exhaust gas chiefly containing the air after power generation reaction is discharged to the outer circumferential region of each of the electrolyte electrode assemblies 18, and is further discharged as the off gas from the fuel cell 10 through the exhaust gas channel 64 (see FIG. 2).

In the first embodiment, the fuel cell 10 has the anode current collector 22 provided between the anode 16 and the separator 28 for collecting electrical energy generated in the electrolyte electrode assembly 18, and supplying the fuel gas to the electrode surface of the anode 16. Further, the fuel cell 10 has at least one fuel gas inlet hole 44 in the separator 28 for supplying the fuel gas to the anode current collector 22. The anode current collector 22 has at least one fuel gas inlet channel 26 having the opening facing the opening at the end of the fuel gas inlet hole 44, for allowing the fuel gas supplied through the fuel gas inlet hole 44 to flow into the anode current collector 22.

In the structure, the anode current collector 22 can have functions of gas permeation, gas diffusion, load absorption, thermal expansion difference absorption or the like in addition to the current collection function. Further, the electrolyte electrode assembly 18 more tightly contacts the separator 28, and thus reduction in the electrical resistance is achieved easily.

Further, blocking of the flow of the fuel gas by the anode current collector 22 in the vicinity of the opening at the downstream end of the fuel gas inlet hole 44 is suppressed, and blowing-out of the fuel gas from between the anode current collector 22 and the separator 28 is suppressed. Therefore, the fuel gas can be supplied to the electrolyte electrode assembly 18 suitably and reliably, and improvement in the power generation efficiency is achieved advantageously.

In this regard, by comparison of power generation performances between the structure where no fuel gas inlet channel 26 is provided in the anode current collector 22 (hereinafter referred to as a comparative example) and the structure where the fuel gas inlet channel 26 is provided in the anode current collector 22 (hereinafter referred to as the present invention), results shown in FIG. 4 were obtained.

Figure 4:
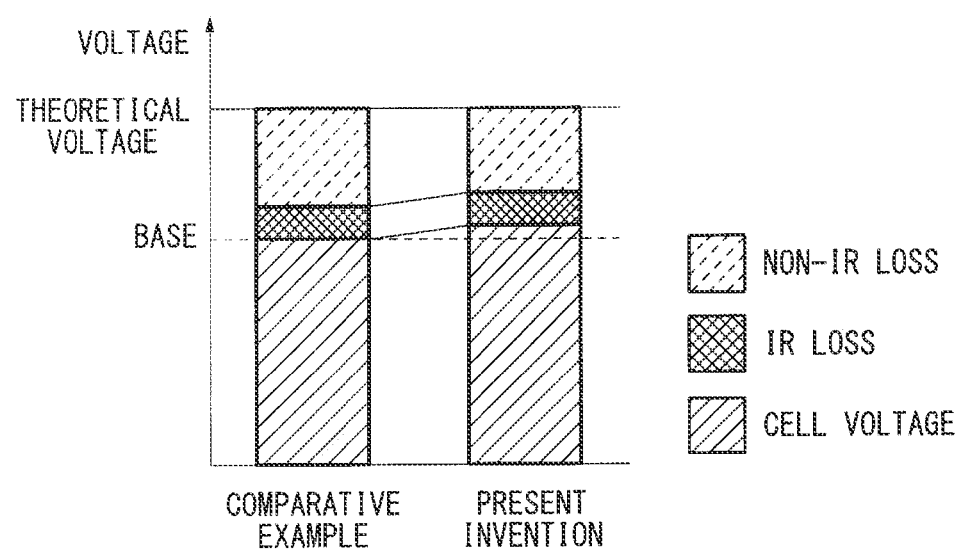
FIG. 4 is a graph showing comparison of power generation characteristics between the present invention and a comparative example.

In FIG. 4, the term "IR loss" is also referred to as an ohm loss of the fuel cell 10, which lowers the voltage of the fuel cell 10. The term "non-IR loss" means the total value of activation overpotential and concentration overpotential. In effect, the non-IR loss can be calculated by subtracting the IR loss from the total loss, and the non-IR loss also lowers the voltage of the fuel cell 10.

In the first embodiment (the present invention), the non-IR loss was reduced by reduction in the mass transfer resistance, and improvement in the cell voltage was achieved. As a result, the power generation performance of the present invention was suitably improved as compared with that of the comparative example.

Further, in the first embodiment, the cross sectional area of the opening of the fuel gas inlet channel 26 is larger than the cross sectional area of the opening of the fuel gas inlet hole 44. In the structure, blocking of the flow of the fuel gas by the anode current collector 22 in the vicinity of the opening at the downstream end of the fuel gas inlet hole 44 is suppressed, and blowing-out of the fuel gas from between the anode current collector 22 and the separator 28 is suppressed. Therefore, the fuel gas can be supplied to the electrolyte electrode assembly 18 suitably and reliably, and improvement in the power generation efficiency is achieved advantageously.

Figure 5:
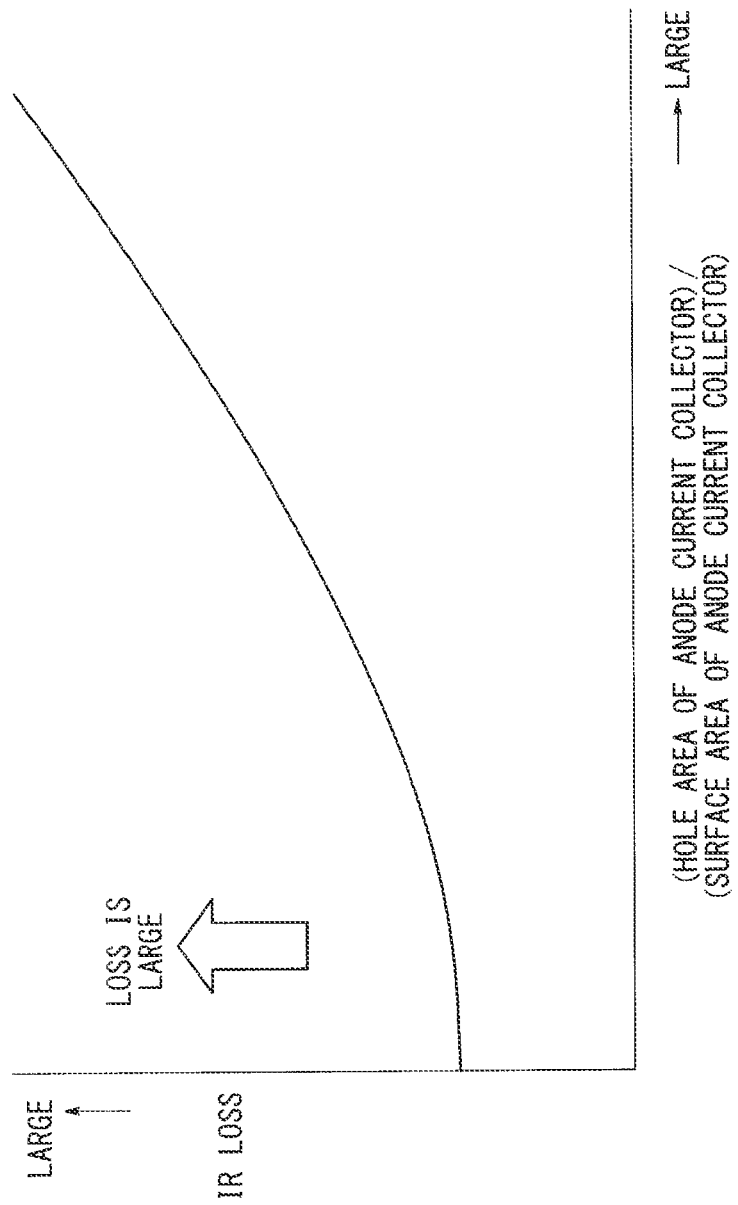
FIG. 5 is a graph showing the relationship between the pore diameter of an anode current collector and IR losses.

FIG. 5 is a graph showing the relationship between the cross sectional area of the opening of the fuel gas inlet channel 26 provided in the anode current collector 22 (sectional area of the hole) and the IR loss. As can be seen from the graph, the IR loss became larger as the cross sectional area of the opening of the fuel gas inlet channel 26 became larger relative to the area of the anode current collector 22.

Further, in the first embodiment, foamed metal of Ni (nickel), nickel alloy, steel material (SUS material) plated with nickel, silver (Ag), silver alloy, or steel material plated with silver is used for the anode current collector 22. In the structure, the anode current collector 22 has functions of gas permeation, gas diffusion, load absorption, thermal expansion difference absorption or the like in addition to the current collection function. Further, the electrolyte electrode assembly 18 contacts the separator 28 more tightly, and reduction in the electrical resistance is achieved easily.

Further, in the first embodiment, the electrolyte electrode assembly 18 is the anode supported electrolyte electrode assembly having the anode 16 as a supporting substrate. In particular, when the thick anode 16 is used, the fuel gas is prevented from blowing out, and then the fuel gas is supplied suitably to the triple phase boundary (boundary between the electrolyte 12 and the anode 16). In the structure, the fuel gas is supplied suitably and reliably to the electrolyte electrode assembly 18, and improvement in the power generation efficiency is achieved.

Further, in the first embodiment, the electrolyte electrode assembly 18 is the anode supported electrolyte electrode assembly (ASC) having the anode 16 as a supporting substrate. In particular, when the thick anode 16 is used, the fuel gas is prevented from blowing out, and then the fuel gas is supplied suitably to the triple phase boundary (boundary between the electrolyte 12 and the anode 16). In the structure, the fuel gas is supplied suitably and reliably to the electrolyte electrode assembly 18, and improvement in the power generation efficiency is achieved.

In the first embodiment, the thickness t1 of the anode current collector 22 is smaller than the thickness t2 of the anode 16. In particular, in the case where the anode 16 having a large thickness t2 is used, blowing-out of the fuel gas is suppressed, and thus the fuel gas is supplied suitably to the triple phase boundary. In the structure, the fuel gas is supplied suitably and reliably to the electrolyte electrode assembly 18, and improvement in the power generation efficiency is achieved.

Figure 6:
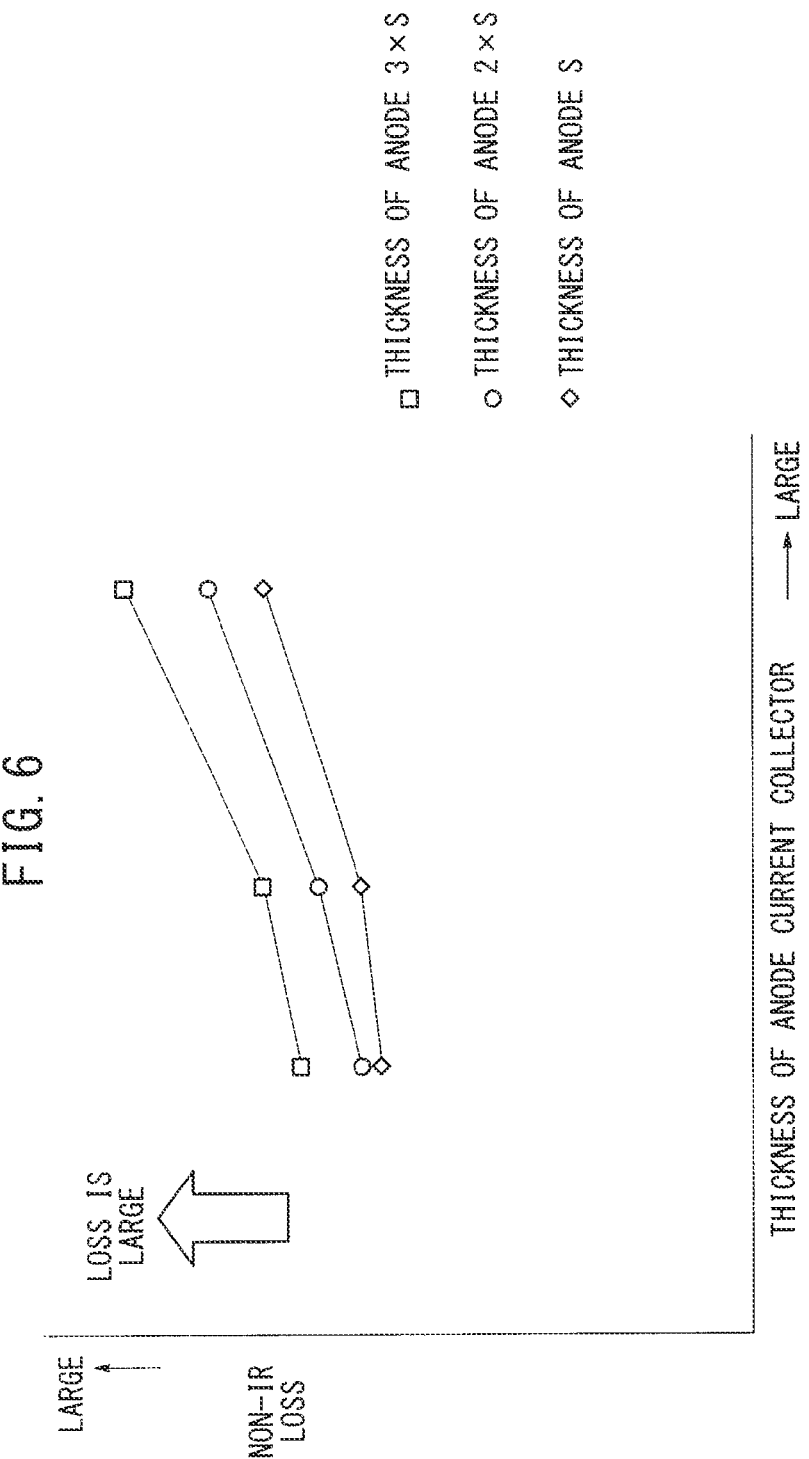
FIG. 6 is a graph showing the relationship between the thickness of an anode, the thickness of the anode current collector, and non-IR losses.

FIG. 6 is a graph showing a non-IR loss when the thickness of the anode 16 and the thickness of the anode current collector 22 are adjusted. As can be seen from the graph, in the case where the thickness of the anode current collector 22 does not change, as the thickness of the anode 16 was lower, the non-IR loss was reduced. In the case where the thickness of the anode 16 does not change, as the thickness of the anode current collector 22 is lower, the non-IR loss was reduced.

Further, in the first embodiment, the outer peripheral portion of the anode current collector 22 is subjected to the densification treatment thereby to have the dense layer 22a. In the structure, when the fuel gas diffuses into the anode current collector 22, blowing-out of the fuel gas from the outer peripheral portion of the anode current collector 22 to the outside is suppressed. Thus, the fuel gas is supplied to the electrolyte electrode assembly 18 suitably and reliably, and improvement in the power generation efficiency is achieved.

Further, in the first embodiment, the fuel cell 10 is a SOFC (solid oxide fuel cell). The first embodiment is particularly suitably applicable to the SOFC operated at high temperature. This is because the anode current collector 22 has functions of gas permeation, gas diffusion, load absorption, thermal expansion difference absorption or the like in addition to the current collection function. Further, the electrolyte electrode assembly 18 contacts the separator 28 more tightly, and reduction in the electrical resistance is achieved easily.

Moreover, in the first embodiment, the fuel cell 10 is a flat-plate type solid oxide fuel cell. The first embodiment is particularly suitably applicable to the flat-plate type SOFC operated at high temperature. This is because the anode current collector 22 has functions of gas permeation, gas diffusion, load absorption, thermal expansion difference absorption or the like in addition to the current collection function. Further, the electrolyte electrode assembly 18 contacts the separator 28 more tightly, and reduction in the electrical resistance is achieved easily.

In the first embodiment, the anode current collector 22 is made of foamed metal. However, the present invention is not limited in this respect. Alternatively, the anode current collector 22 may be made of metal mesh or metal felt.

Figure 7:
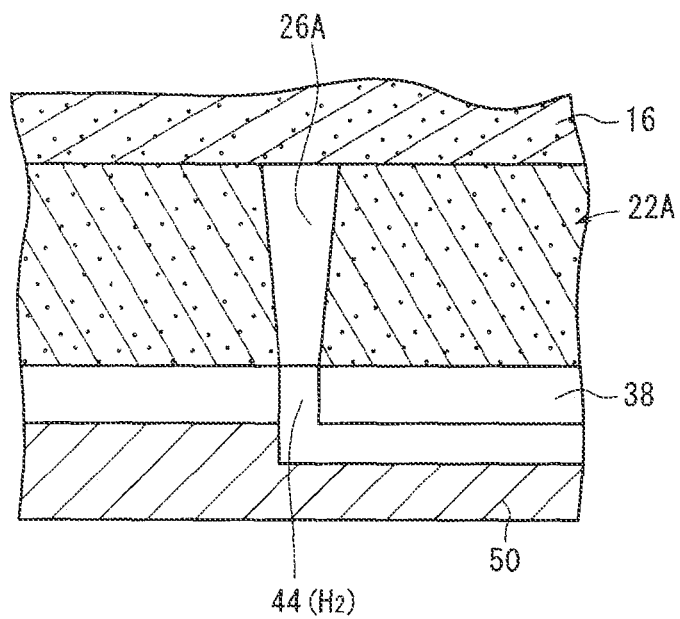
FIG. 7 is a cross sectional view showing an anode current collector according to a second embodiment of the present invention.

In the first embodiment, the opening of the fuel gas inlet channel 26 provided in the anode current collector 22 has a cylindrical shape. However, the present invention is not limited in this respect. For example, in a second embodiment shown in FIG. 7, an anode current collector 22A is provided.

The anode current collector 22A includes a fuel gas inlet channel 26A having an opening in a conical shape. The diameter of the opening of the fuel gas inlet channel 26A is progressively increased from the fuel gas inlet hole 44 toward the anode 16.

Figure 8:
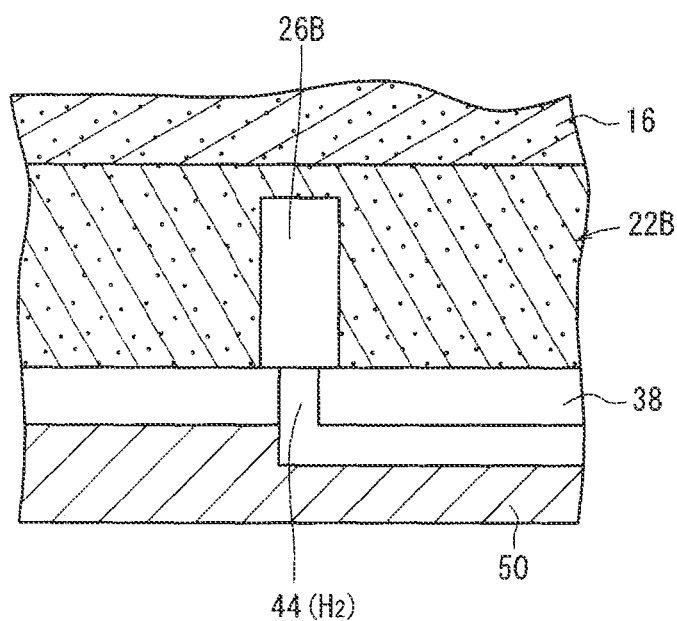
FIG. 8 is a cross sectional view showing an anode current collector according to a third embodiment of the present invention.

Further, in a third embodiment shown in FIG. 8, an anode current collector 22B is provided. The anode current collector 22B includes a fuel gas inlet channel 26B having an opening in a cylindrical shape. One end of the fuel gas inlet channel 26B is open to the fuel gas inlet hole 44, and the other end of the fuel gas inlet channel 26B on the anode 16 side is closed. In the second and third embodiments having the above structure, the same advantages as in the case of the first embodiment are obtained.

Further, in the first embodiment, the outer peripheral portion of the anode current collector 22 is subjected to the densification treatment by the laser thereby to have the dense layer 22a. However, the present invention is not limited in this respect.

Figure 9:
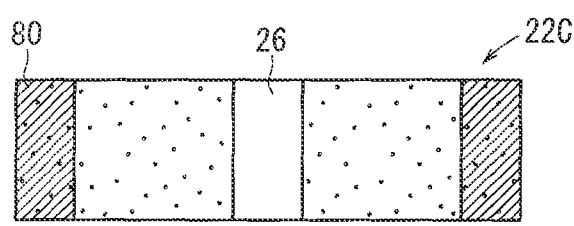
FIG. 9 is a cross sectional view showing an anode current collector according to a fourth embodiment of the present invention.
Figure 10:
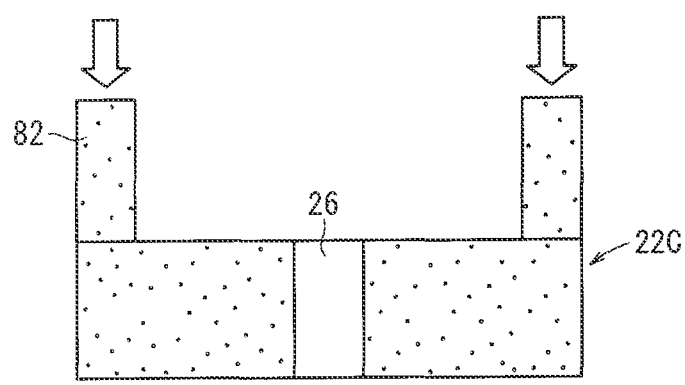
FIG. 10 is a cross sectional view showing a method of producing the anode current collector.

For example, in a fourth embodiment shown in FIG. 9, an anode current collector 22C is provided. A dense layer 80 is provided in the outer peripheral portion of the anode current collector 22C. More specifically, as shown in FIG. 10, a ring member 82 is firstly disposed at a position corresponding to the outer end of the anode current collector 22C. Then, the ring member 82 is pressed on the outer peripheral portion of the anode current collector 22C thereby to form the dense layer 80.

Figure 11:
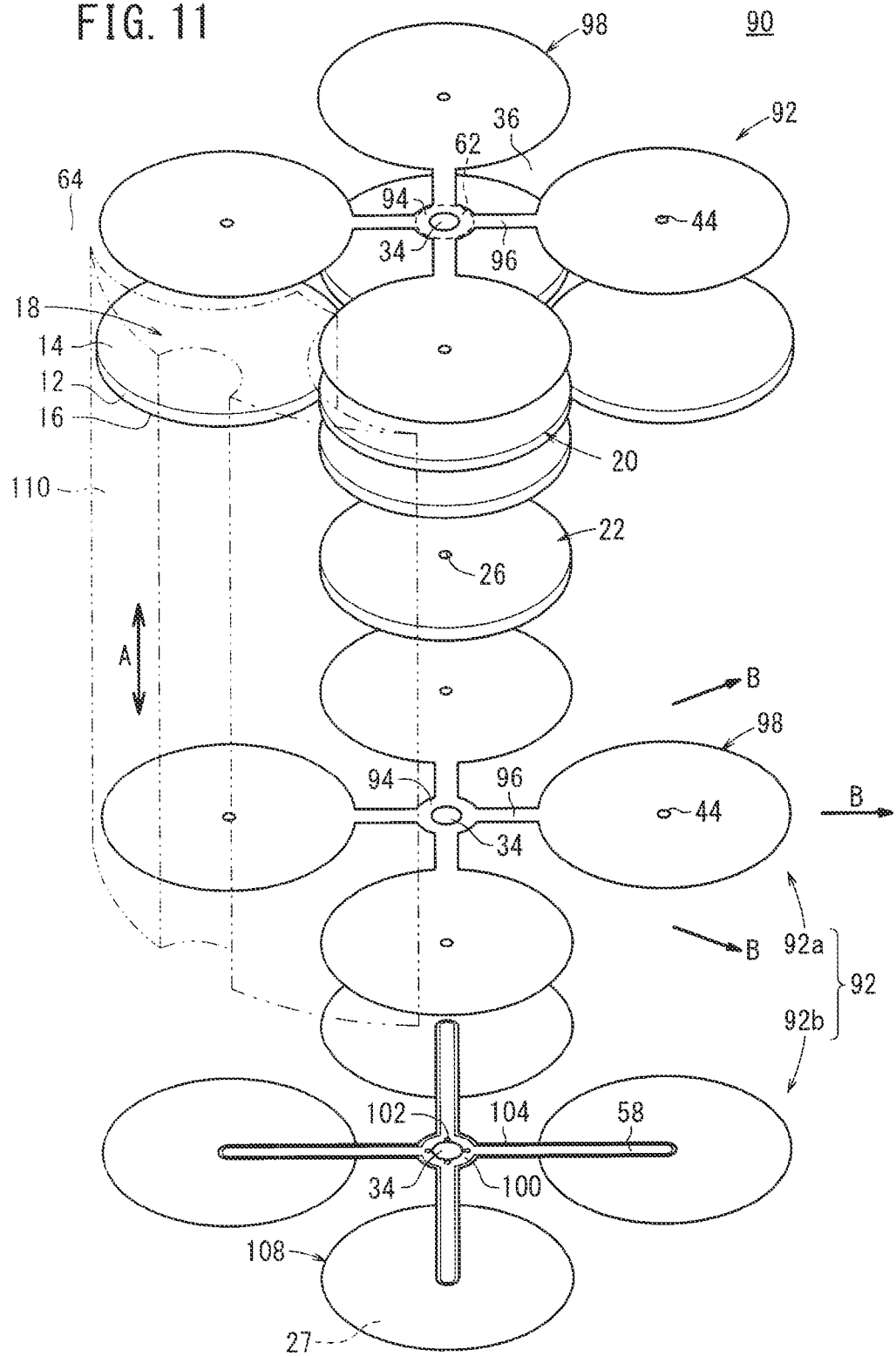
FIG. 11 is an exploded perspective view showing a fuel cell according to a fifth embodiment of the present invention.

FIG. 11 is an exploded perspective view showing a fuel cell 90 according to a fifth embodiment of the present invention.

The constituent elements that are identical to those of the fuel cell 10 according to the first embodiment are labeled with the same reference numerals, and description thereof will be omitted. Also in a sixth embodiment as described later, the constituent elements that are identical to those of the fuel cell 10 according to the first embodiment are labeled with the same reference numerals, and description thereof will be omitted.

The fuel cell 90 includes separators 92 and a plurality of, e.g., four electrolyte electrode assemblies 18 between the separators 92. The electrolyte electrode assemblies 18 are arranged concentrically around a fuel gas supply passage 34 extending through the center of the separators 92. The four electrolyte electrode assemblies 18 are sandwiched between a pair of the separators 92 such that cathode current collectors 20 and anode current collectors 22 are interposed between the separators 92 and the electrolyte electrode assemblies 18, respectively.

Each of the separators 92 is formed by joining a first plate 92a and a second plate 92b together. For example, the first and second plates 92a, 92b are metal plates of, e.g., stainless alloy. The first plate 92a includes a first fuel gas supply section 94, and the fuel gas supply passage 34 extends through the center of the first fuel gas supply section 94. Four first bridge sections 96 extend radially outwardly from the first fuel gas supply section 94 at equal angular intervals (90°). The first fuel gas supply section 94 is integral with first sandwiching sections 98 each having a relatively large diameter through the first bridge sections 96. The centers of the first sandwiching sections 98 are equally distanced from the center of the first fuel gas supply section 94.

Each of the first sandwiching sections 98 has a circular disk shape having the same size as the electrolyte electrode assemblies 18. The first sandwiching sections 98 are separated from each other. The first sandwiching section 98 has a fuel gas inlet hole 44 for supplying the fuel gas to the first sandwiching section 98, and which is disposed, for example, at the center of the first sandwiching section 98 or at a position deviated from the center of the first sandwiching section 98 toward the upstream side in the flow direction of the oxygen-containing gas.

The second plate 92b is fixed onto surfaces of the sandwiching sections 98 that face the cathode 14, e.g., by brazing, diffusion bonding, or laser welding. The second plate 92b includes a second fuel gas supply section 100, and the fuel gas supply passage 34 extends through the center of the second fuel gas supply section 100. A predetermined number of reinforcement bosses 102 are provided on the second fuel gas supply section 100.

Four second bridge sections 104 radially extends from the second fuel gas supply section 100, and a fuel gas supply channel 58 connecting the fuel gas supply passage 34 to the fuel gas inlet hole 44 is formed between the second fuel gas supply section 100 and each of the second bridge sections 104. For example, the fuel gas supply channel 58 is formed by etching or pressing. Each of the second bridge sections 104 is integral with a second sandwiching section 108 having a relatively large diameter.

An insulating seal 62 for sealing the fuel gas supply passage 34 is provided in each space between the adjacent separators 92. The insulating seal 62 functions to seal the fuel gas supply passage 34 with respect to the electrolyte electrode assembly 18.

In the fuel cell 90, an exhaust gas channel 64 is formed around the first and second sandwiching sections 98, 108. The exhaust gas channel 64 forms an exhaust gas discharge section for discharging the fuel gas and the oxygen-containing gas consumed in the electrolyte electrode assemblies 18 as an exhaust gas in the stacking direction. An air regulating plate 110 is provided in each space between the first and second sandwiching sections 98, 108, if necessary (see FIG. 11).

Operation of the fuel cell 90 having the above structure will be described below.

Figure 12:
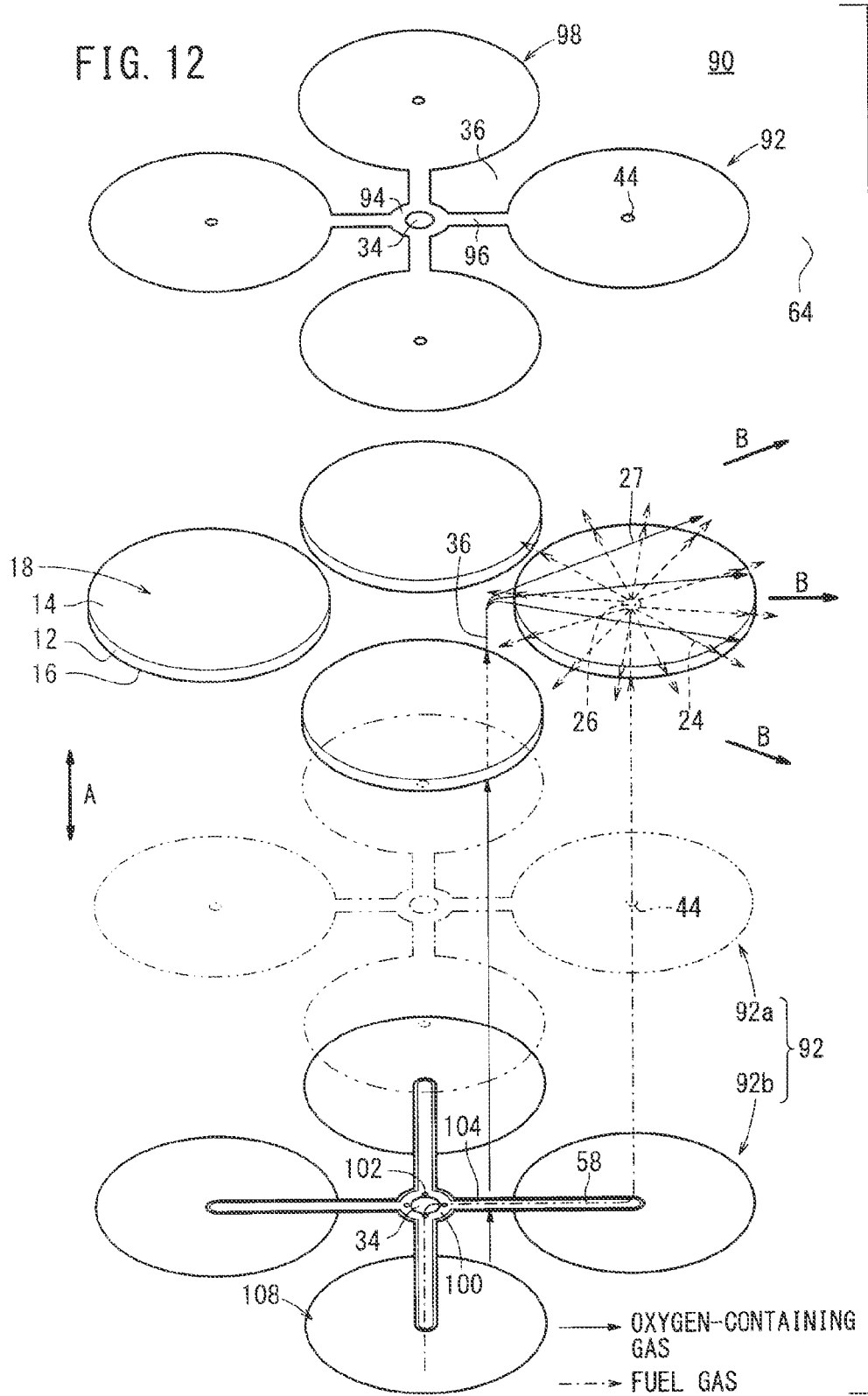
FIG. 12 is a partially exploded perspective view showing gas-flow in the fuel cell.

As shown in FIGS. 11 and 12, the fuel gas is supplied to the fuel gas supply passage 34, and air, which is an oxygen-containing gas, is supplied to the oxygen-containing gas supply passage 36.

Figure 13:
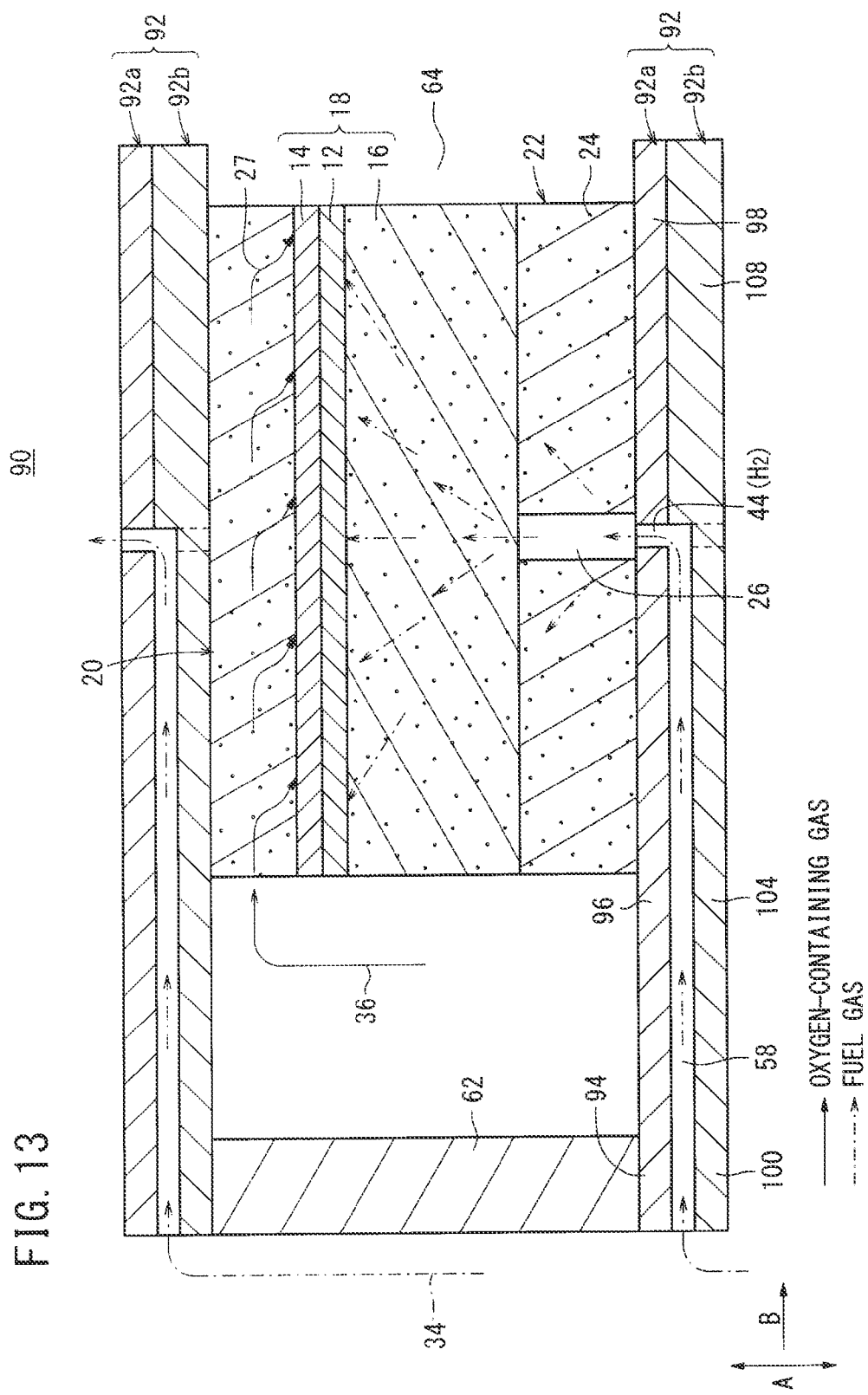
FIG. 13 is a cross sectional view schematically showing operation of the fuel cell.

As shown in FIG. 13, the fuel gas flows along the fuel gas supply passage 34 in the stacking direction indicated by the arrow A, and then, the fuel gas moves through the fuel gas supply channel 58 of the fuel cell 90 along the surfaces of the separator 92.

The fuel gas from the fuel gas supply channel 58 flows into the fuel gas inlet channel 26 of the anode current collector 22 through the fuel gas inlet hole 44 formed in the first sandwiching section 98. Thus, the fuel gas flows through the fuel gas inlet channel 26 to a substantially central region of the anode 16, and then, the fuel gas moves toward the outer circumferential region of the anode 16.

In the meanwhile, the air supplied to the oxygen-containing gas supply passage 36 flows into between the inner circumferential edges of the electrolyte electrode assembly 18 and the inner circumferential edges of the first and second sandwiching sections 98, 108 in the direction indicated by the arrow B, and flows to the oxygen-containing gas channel 27. In the oxygen-containing gas channel 27, the oxygen-containing gas flows from the inner circumferential edge (center of the separator 92) to the outer circumferential edge (outer circumferential edge of the separator 92) of the cathode 14 of the electrolyte electrode assembly 18, i.e., from one end to the other end of the cathode 14 of the electrolyte electrode assembly 18.

Thus, in each of the electrolyte electrode assemblies 18, the fuel gas flows from the center to the outer circumferential side on the electrode surface of the anode 16, and the oxygen-containing gas flows in one direction indicated by the arrow B on the electrode surface of the cathode 14. At this time, oxygen ions (oxide ions) flow through the electrolyte 12 to the anode 16 for generating electricity by electrochemical reaction.

In the fifth embodiment having the above structure, the same advantages as in the case of the first embodiment are obtained.

Figure 14:
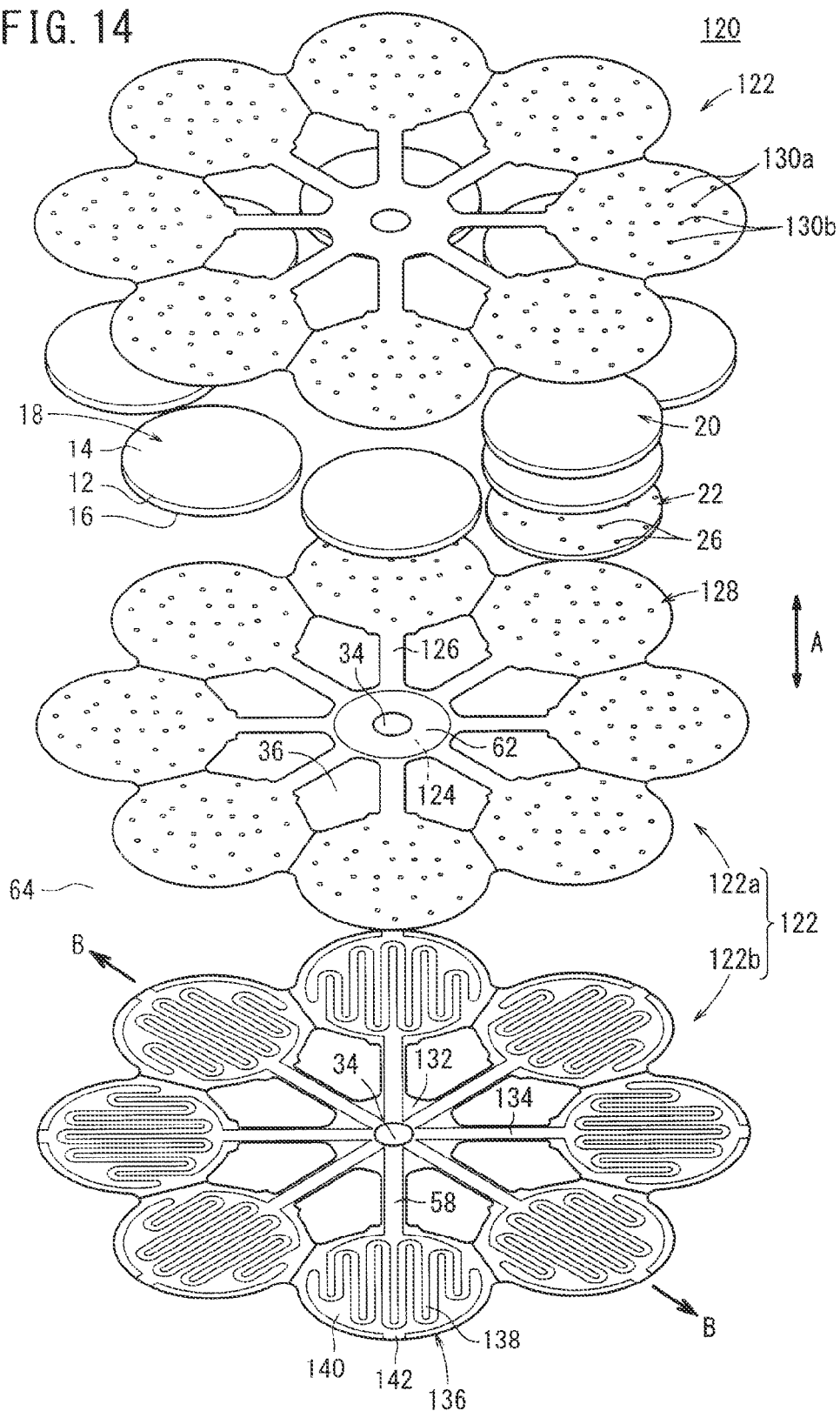
FIG. 14 is an exploded perspective view showing a fuel cell according to a sixth embodiment of the present invention.

FIG. 14 is an exploded perspective view showing a fuel cell 120 according to a sixth embodiment of the present invention.

The fuel cell 120 includes separators 122 and a plurality of, e.g., eight electrolyte electrode assemblies 18 between the separators 122. The electrolyte electrode assemblies 18 are arranged concentrically around a fuel gas supply passage 34 extending through the center of the separators 122. The eight electrolyte electrode assemblies 18 are sandwiched between a pair of the separators 122 such that cathode current collectors 20 and anode current collectors 22 are interposed between the separators 122 and the electrolyte electrode assemblies 18, respectively.

Each of the separators 122 is formed by joining a first plate 122a and a second plate 122b together. For example, the first and second plates 122a, 122b are metal plates of, e.g., stainless alloy. The first plate 122a includes a first fuel gas supply section 124, and the fuel gas supply passage 34 extends through the center of the first fuel gas supply section 124. Eight first bridge sections 126 extend radially outwardly from the first fuel gas supply section 124 at equal angular intervals. The first fuel gas supply section 124 is integral with first sandwiching sections 128 each having a relatively large diameter through the first bridge sections 126.

Each of the first sandwiching sections 128 has a circular disk shape having the same size as the electrolyte electrode assemblies 18. Each of the sandwiching sections 128 has a plurality of fuel gas inlet holes 130a and a plurality of exhaust gas outlet holes 130b arranged alternately (see FIGS. 14 and 15). The fuel gas is supplied to the anode 16 of the electrolyte electrode assembly 18 through the fuel gas inlet holes 130a like a shower, and the fuel gas consumed at the anode 16 is discharged from the anode 16 through the exhaust gas outlet holes 130b like a shower.

A plurality of fuel gas inlet channels 26 that are open to the fuel gas inlet holes 130a are formed in the anode current collector 22. The cross sectional area of the opening of each fuel gas inlet channel 26 is larger than the cross sectional area of the opening of each fuel gas inlet hole 130a (see FIG. 16).

As shown FIG. 14, the second plate 122b is fixed onto surfaces of the first sandwiching sections 128 which are opposite to the surfaces which contact the anode 16, e.g., by brazing, diffusion bonding, laser welding or the like. The second plate 122b has a flat-plate shape, and has a second fuel gas supply section 132. The fuel gas supply passage 34 extends through the center of the second fuel gas supply section 132.

Eight second bridge sections 134 extend radially from the second fuel gas supply section 132. A second sandwiching section 136 is formed integrally with each of the second bridge sections 134. Alternatively, the second sandwiching section 136 may be provided as a separate part, and connected to each of the second bridge sections 134. A fuel gas supply channel 58 is formed in each of the second bridge sections 134. The fuel gas supply channel 58 is connected to the fuel gas supply passage 34, and extends from the second fuel gas supply section 132 along the separator surfaces.

The second sandwiching section 136 has a fuel gas supply chamber 138 and an exhaust gas discharge chamber 140. The fuel gas supply chamber 138 is connected to the fuel gas supply channel 58 and the fuel gas inlet holes 130a thereby for supplying the fuel gas from the fuel gas supply channel 58 to the fuel gas inlet holes 130a. The exhaust gas discharge chamber 140 is connected to the exhaust gas outlet holes 130b thereby for discharging the exhaust gas from the exhaust gas outlet holes 130b to the exhaust gas discharge chamber 140.

The fuel gas supply chamber 138 is branched into a plurality of channels, e.g., five channels corresponding to five lines of the fuel gas inlet holes 130a, and the exhaust gas discharge chamber 140 is branched into, e.g., six channels corresponding to six lines of the exhaust gas outlet holes 130b. The five channels of the fuel gas supply chamber 138 and the six channels of the exhaust gas discharge chamber 140 are arranged alternately. The exhaust gas discharge chamber 140 is connected to the exhaust gas channel 64 through an exhaust gas discharge channel 142 provided at the outer end of the second sandwiching section 136.

Operation of the fuel cell 120 having the above structure will be described below.

The fuel gas (hydrogen-containing gas) is supplied to the fuel gas supply passage 34, and the oxygen-containing gas (air) is supplied to the oxygen-containing gas supply passage 36.

The fuel gas flows along the fuel gas supply passage 34 in the stacking direction indicated by the arrow A, and then, the fuel gas moves through the fuel gas supply channel 58 of the fuel cell 120 along the separator surfaces indicated by the arrow B.

Figure 15:
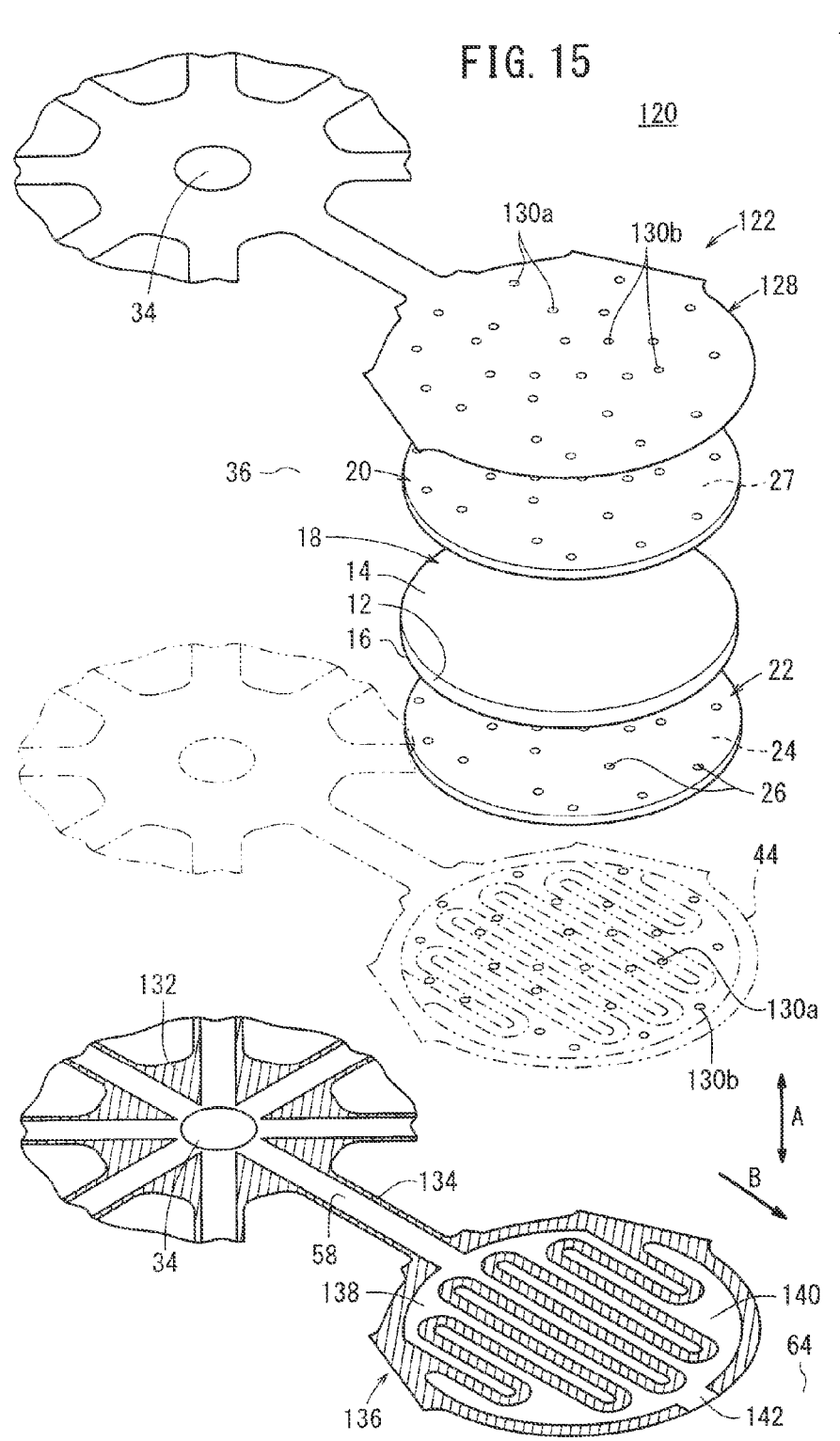
FIG. 15 is a partially exploded perspective view showing gas-flow in the fuel cell.
Figure 16:
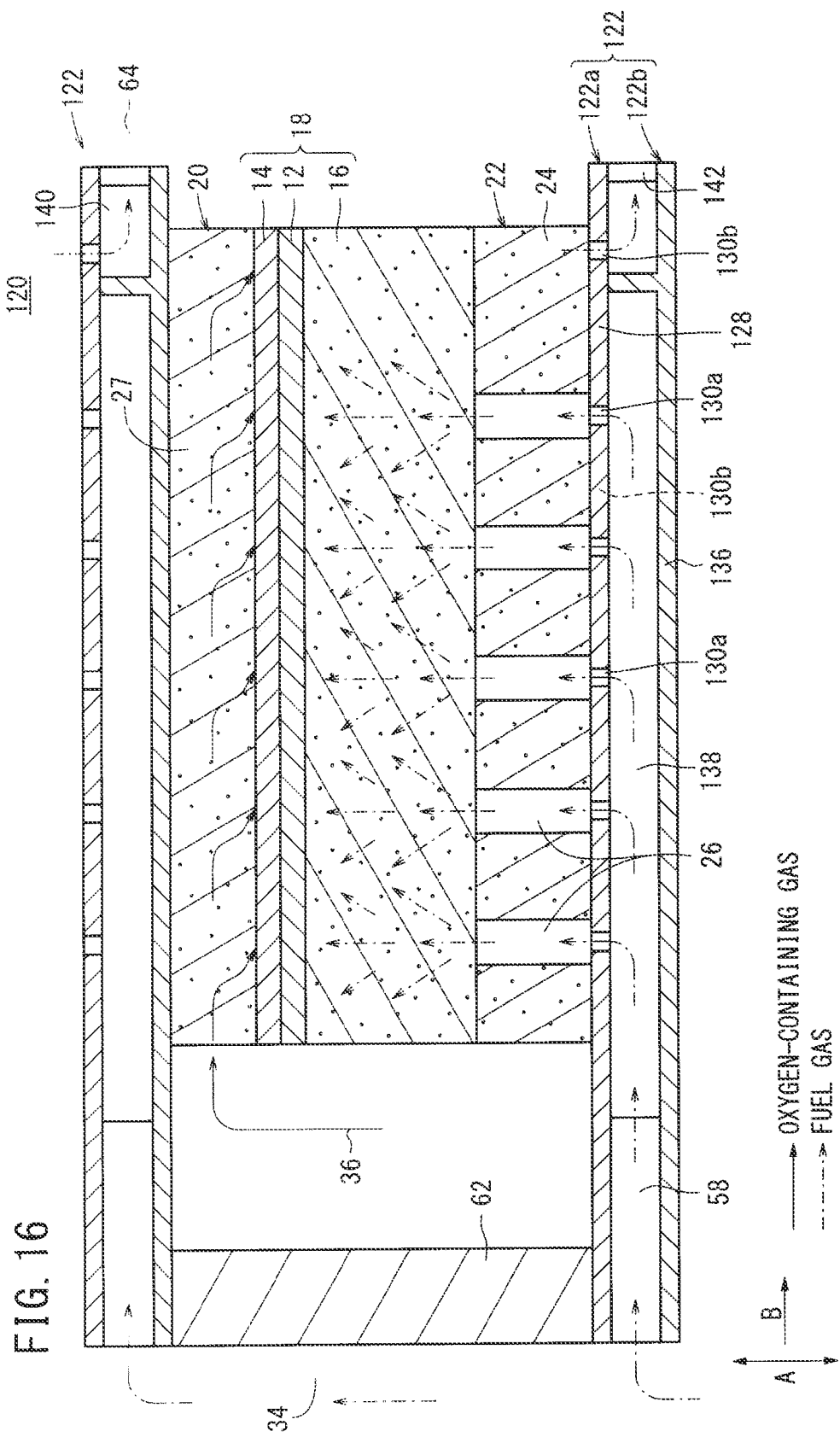
FIG. 16 is a cross sectional view schematically showing operation of the fuel cell.
Figure 17:
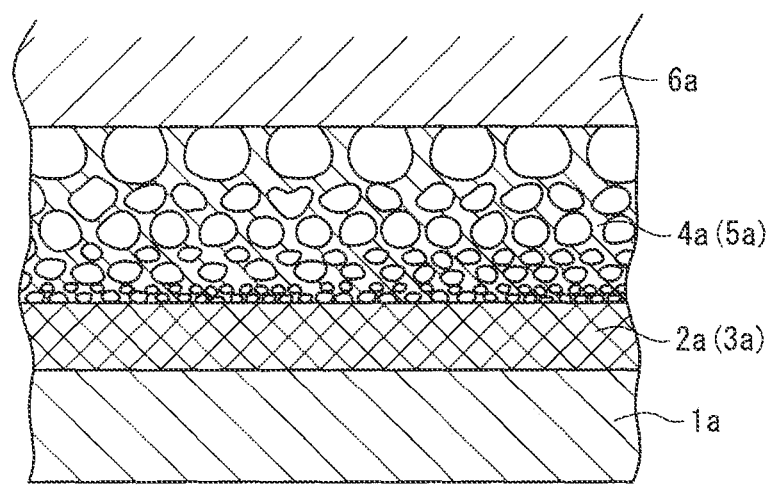
FIG. 17 is a cross sectional view showing a solid oxide fuel cell disclosed in Japanese Laid-Open Patent Publication No. 2002-358980.
Figure 18:
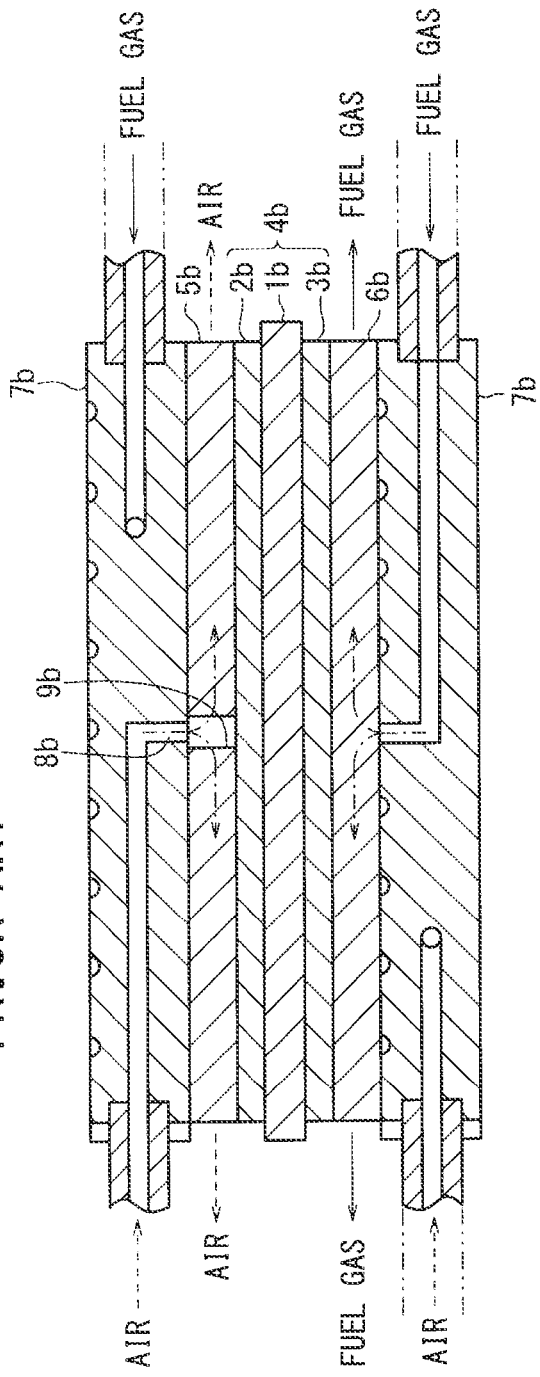
FIG. 18 is a cross sectional view showing a solid oxide fuel cell disclosed in Japanese Laid-Open Patent Publication No. 2008-251238.

As shown in FIGS. 15 and 16, the fuel gas is temporarily supplied from the fuel gas supply channel 58 into the fuel gas supply chamber 138. The fuel gas supply chamber 138 is connected to a plurality of the fuel gas inlet holes 130a arranged in five lines in the first sandwiching section 128.

In the structure, the fuel gas from the fuel gas supply chamber 138 flows through the fuel gas inlet holes 130a, and the fuel gas is supplied into the fuel gas inlet channels 26 of the anode current collector 22. Thus, the fuel gas is supplied like a shower to the entire electrode surface of the anode 16 of the electrolyte electrode assembly 18 through the fuel gas inlet channels 26.

The fuel gas supplied to the anode 16 through the fuel gas inlet holes 130a flows through the fuel gas channel 24, and the fuel gas is discharged like a shower into the exhaust gas discharge chamber 140 through the exhaust gas outlet holes 130b. The exhaust gas discharge chamber 140 is connected to the exhaust gas outlet holes 130b arranged in a plurality of, i.e., six lines. The exhaust gas discharged from the exhaust gas outlet holes 130b to the exhaust gas discharge chamber 140 is collected into the exhaust gas discharge channel 142, and then, discharged to the exhaust gas channel 64.

In the meanwhile, the air supplied to the oxygen-containing gas supply passage 36 flows into between the inner circumferential edge of the electrolyte electrode assembly 18 and the inner circumferential edges of the first and second sandwiching sections 128, 136 in the direction indicated by the arrow B, and flows to the oxygen-containing gas channel 27. In the oxygen-containing gas channel 27, the oxygen-containing gas flows from the inner circumferential edge (center of the separator 122) to the outer circumferential edge (outer circumferential edge of the separator 122) of the cathode 14 of the electrolyte electrode assembly 18, i.e., from one end to the other end of the cathode 14 of the electrolyte electrode assembly 18.

Thus, in each of the electrolyte electrode assemblies 18, the fuel gas is supplied like a shower to the entire electrode surface of the anode 16, and the air is supplied in one direction indicated by the arrow B on the electrode surface of the cathode 14. At this time, oxygen ions (oxide ions) flow through the electrolyte 12 to the anode 16 for generating electricity by electrochemical reactions.

The air after reaction in the power generation and the fuel gas after reaction in the power generation are discharged to the outer circumferential portion of each electrolyte electrode assembly 18, and then discharged as an off gas from the fuel cell 120 through the exhaust gas channel 64.

In the six embodiment having the above structure, the same advantages as in the cases of the first and fifth embodiments are obtained.

Although certain preferred embodiments of the present invention have been shown and described in detail, it should be understood that various changes and modifications may be made therein without departing from the scope of the appended claims.

The invention claimed is:

1. A fuel cell formed by stacking an electrolyte electrode assembly between separators, the electrolyte electrode assembly including an anode, a cathode and an electrolyte interposed between the anode and the cathode,
   the fuel cell comprising an anode current collector provided between the anode and the separator, for collecting electrical energy generated in the electrolyte electrode assembly, and supplying a fuel gas to an electrode surface of the anode, the anode current collector being separate and distinct from the separator,
   wherein the separator has a fuel gas inlet hole for supplying the fuel gas to the anode current collector;
   the anode current collector has a fuel gas inlet channel having an opening that faces an opening of the fuel gas inlet hole at an end of the fuel gas inlet hole, for allowing the fuel gas supplied through the fuel gas inlet hole to flow into the anode current collector; and
   the anode current collector has a first surface adjacent to the anode and a second surface opposite to the first surface and adjacent to the separator, and the fuel gas inlet channel is defined by an inner wall surrounding an empty space formed in the anode current collector that continuously extends from the first surface to the second surface and passes entirely through the anode current collector.

2. The fuel cell according to claim 1, wherein the cross sectional area of the opening of the fuel gas inlet channel is larger than the cross sectional area of the opening of the fuel gas inlet hole, such that a portion of a surface of the separator surrounding the opening of the fuel gas inlet hole is exposed from the anode current collector through the opening of the fuel gas inlet channel.

3. The fuel cell according to claim 1, wherein the anode current collector is made of foamed metal.

4. A fuel cell formed by stacking an electrolyte electrode assembly between separators, the electrolyte electrode assembly including an anode, a cathode and an electrolyte interposed between the anode and the cathode,
   the fuel cell comprising an anode current collector provided between the anode and the separator, for collecting electrical energy generated in the electrolyte electrode assembly, and supplying a fuel gas to an electrode surface of the anode, the anode current collector being separate and distinct from the separator,
   wherein the separator has at least one fuel gas inlet hole for supplying the fuel gas to the anode current collector;
   the anode current collector has at least one fuel gas inlet channel having an opening that faces an opening of the fuel gas inlet hole at an end of the fuel gas inlet hole, for allowing the fuel gas supplied through the fuel gas inlet hole to flow into the anode current collector; and
   in the anode current collector, an inner wall forming the fuel gas inlet channel is denser than portions other than the inner wall.

5. The fuel cell according to claim 1, wherein the electrolyte electrode assembly is an anode supported electrolyte electrode assembly having the anode as a supporting substrate.

6. The fuel cell according to claim 1, wherein the thickness of the anode current collector is smaller than the thickness of the anode.

7. The fuel cell according to claim 1, wherein a densification treatment is performed on an outer peripheral portion of the anode current collector.

8. The fuel cell according to claim 1, wherein the fuel cell is a solid oxide fuel cell.

9. The fuel cell according to claim 1, wherein the fuel cell is a flat-plate type solid oxide fuel cell.

10. The fuel cell according to claim 1, wherein
    each of the separators comprise: a first plate; and a second plate joined to the first plate, and
    the anode current collector is provided between the anode and one of the first plate and the second plate of the separator.

11. The fuel cell according to claim 1, wherein, in the anode current collector, at least a portion of the inner wall forming the fuel gas inlet channel and surrounding the empty space is spaced from the separator.

12. The fuel cell according to claim 1, wherein a cross sectional area of the opening of the fuel gas inlet channel at the second surface is smaller than a cross sectional area of an opening of the fuel gas inlet channel at the first surface.

13. The fuel cell according to claim 1, wherein, in the anode current collector, an outer peripheral portion is denser than portions other than the outer peripheral portion.

* * * * *